(12) United States Patent
Gregory (10) Patent No.: US 12,368,696 B2
(45) Date of Patent: Jul. 22, 2025

(54) FIREWALL GATEWAY DEVICE AND RELATED METHODS FOR PROTECTING DISTRIBUTED ENERGY RESOURCES AND OTHER OPERATIONAL TECHNOLOGIES AGAINST CYBERATTACKS

(71) Applicant: AP CYBER LLC, Raleigh, NC (US)

(72) Inventor: Daniel Constantine Gregory, Fort Collins, CO (US)

(73) Assignee: AP CYBER LLC, Raleigh, NC (US)

( * ) Notice: Subject to any disclaimer, the term of this patent is extended or adjusted under 35 U.S.C. 154(b) by 0 days.

(21) Appl. No.: 18/231,423

(22) Filed: Aug. 8, 2023

(65) Prior Publication Data

US 2024/0121213 A1    Apr. 11, 2024

Related U.S. Application Data

(63) Continuation of application No. PCT/US2022/016598, filed on Feb. 16, 2022.
(Continued)

(51) Int. Cl.
*H04L 9/40* (2022.01)

(52) U.S. Cl.
CPC ...... *H04L 63/0263* (2013.01); *H04L 63/0209* (2013.01); *H04L 63/0227* (2013.01); *H04L 63/0236* (2013.01); *H04L 63/0254* (2013.01); *H04L 63/0272* (2013.01); *H04L 63/101* (2013.01); *H04L 63/1433* (2013.01); *H04L 63/20* (2013.01)

(58) Field of Classification Search
CPC ............ H04L 63/0263; H04L 63/0209; H04L 63/0227; H04L 63/0236; H04L 63/0254; H04L 63/0272; H04L 63/101; H04L 63/1433; H04L 63/20
See application file for complete search history.

(56) References Cited

U.S. PATENT DOCUMENTS

| | | | |
|---|---|---|---|
| 2012/0014395 A1* | 1/2012 | Komatsu | H04L 69/18 370/467 |
| 2012/0144187 A1* | 6/2012 | Wei | H04L 63/168 713/152 |

(Continued)

OTHER PUBLICATIONS

International Search Report and Written Opinion of the International Searching Authority, PCT/US2022/016598, mailed Jun. 2, 2022, 7 pages.

*Primary Examiner* — Noura Zoubair
(74) *Attorney, Agent, or Firm* — Sage Patent Group (57) ABSTRACT

A method for securely monitoring and controlling a distributed energy resource is disclosed. One method includes utilizing at least one physical switching component to enable a communication protocol from among a plurality of communication protocols in a firewall gateway device that is protecting a resource device and receiving, at the firewall gateway device, one or more packets associated with ingress messaging directed to the protected resource device. The method further includes identifying the one or more packets as suspicious packets if the ingress messaging fails to correspond to the enabled communication protocol and conducting a remediation action in response to the identifying of suspicious packets or in response to detecting a local problem with at least one internal component of the firewall gateway device.

10 Claims, 4 Drawing Sheets

Related U.S. Application Data (60) Provisional application No. 63/149,821, filed on Feb. 16, 2021.

(56) References Cited

U.S. PATENT DOCUMENTS

| | | | |
|---|---|---|---|
| 2012/0323381 A1* | 12/2012 | Yadav | H04L 63/0236 |
| | | | 700/286 |
| 2014/0283047 A1* | 9/2014 | Dixit | H04L 63/1425 |
| | | | 726/23 |
| 2015/0281278 A1 | 10/2015 | Gooding et al. | |
| 2017/0341604 A1* | 11/2017 | Ben Noon | B60R 16/023 |

* cited by examiner

FIREWALL GATEWAY DEVICE AND RELATED METHODS FOR PROTECTING DISTRIBUTED ENERGY RESOURCES AND OTHER OPERATIONAL TECHNOLOGIES AGAINST CYBERATTACKS

RELATED APPLICATIONS

The presently disclosed subject matter is a continuation of PCT International Application No. PCT/US2022/016598 filed on Feb. 16, 2022, which claims priority to U.S. Provisional Patent Application Ser. No. 63/149,821, filed Feb. 16, 2021; the disclosures and content of which are incorporated herein by reference in their entireties.

TECHNICAL FIELD

The subject matter described herein relates to the prevention of cyberattacks directed to operational technology, such as distributed energy resources, electric vehicles charging systems, industrial control systems, power electronics, and other operational technologies. More particularly, the subject matter described herein relates to a firewall gateway device and related methods for protecting distributed energy resources and other operational technologies against cyberattacks.

BACKGROUND

At present, cyberattacks and undetected intrusions into all types of computer-based systems are prevalent. Notably, electric grid operations are particularly vulnerable to such cyber-related threats conducted by malicious actors. Most public utilities operate complex cloud-based systems across vast geographical areas to manage the electric grids and connected distributed energy resources in real-time. Recent news events related to previously undetected intrusions into our government systems and nation's infrastructure by various international entities constitute a real and present danger to our national security.

Moreover, the widescale deployment of distributed energy resources and electric microgrids may require expansion of these cloud-based real-time systems to properly utilize and monetize these distributed energy resource assets. The adoption of these advanced technologies, such as virtual power plants, affords many advantages, but similarly adds to the already concerning electric grid vulnerabilities. As such, significant efforts are needed to eliminate the threat of cyberattack to the nation's power grids and connected equipment. More specifically, there is a need for protection measures tailored to virtual power plants, distributed energy resources, and electric microgrids in order to address the associated vulnerabilities to cyberattack, hacking, and/or undetected intrusions by unauthorized individuals, organizations, or foreign government actors.

SUMMARY

A method for protecting a distributed energy resource is disclosed. One method includes utilizing at least one physical switching component to enable a communication protocol from among a plurality of communication protocols in a firewall gateway device that is protecting a resource device and receiving, at the firewall gateway device, one or more packets associated with ingress messaging directed to the protected resource device. The method further includes identifying the one or more packets as suspicious packets if the ingress messaging fails to correspond to the enabled communication protocol and conducting a remediation action in response to the identifying of suspicious packets or in response to detecting a local problem with at least one internal component of the firewall gateway device.

According to aspect of the method described herein, the protected resource device includes a distributed energy resource device.

According to aspect of the method described herein, the ingress messaging includes control messages related to the security and monitoring of the protected resource device.

According to aspect of the method described herein, the firewall gateway device includes a failsafe watchdog timer circuit that is configured to instruct a latching relay to switch to an open position in response to detecting the local problem occurring at the firewall gateway device.

According to aspect of the method described herein, the local problem detected by the failsafe watchdog timer circuit includes at least one of: a power supply failure, a kernel lockup, a self-diagnostic alarm, a random access memory overflow, corruption of firmware, tampering with the firmware, failure of non-volatile memory, or removal of the non-volatile memory from a circuit board socket.

According to aspect of the method described herein, the physical switching component includes a respective at least one dual in-line package (DIP) switch, wherein actuators of the DIP switch are manually positioned to designate the communication protocol.

According to aspect of the method described herein, identifying the one or more packets as suspicious packets includes conducting a digital filtering process on the one or more packets.

According to another aspect of the disclosed subject matter described herein, a firewall gateway device for protecting a distributed energy resource is disclosed. One firewall gateway device includes at least one physical switching component configured to enable a communication protocol from among a plurality of communication protocols in a firewall gateway device that is protecting a resource device and at least one data port that is configured to receive one or more packets associated with ingress messaging directed to the protected resource device. The firewall gateway device may further include a digital filtering engine configured to identify the one or more packets as suspicious packets if the ingress messaging fails to correspond to the enabled communication protocol and to conduct a remediation action in response to the identifying of suspicious packets and a failsafe watchdog timer circuit configured to conduct a remediation action in response in response to detecting a local problem with at least one internal component of the firewall gateway device.

According to aspect of the firewall gateway device described herein, the protected resource device includes at least one distributed energy resource device.

According to aspect of the firewall gateway device described herein, the ingress messaging includes control messages related to the security and monitoring of the protected resource device.

According to aspect of the firewall gateway device described herein, the firewall gateway device includes a failsafe watchdog timer circuit that is configured to instruct a latching relay to switch to an open position in response to detecting the local problem occurring at the firewall gateway device.

According to aspect of the firewall gateway device described herein, the local problem detected by the failsafe watchdog timer circuit includes at least one of: a power supply failure, a kernel lockup, a self-diagnostic alarm, a random access memory overflow, corruption of firmware, tampering with the firmware, failure of non-volatile memory, or removal of the non-volatile memory from a circuit board socket.

According to aspect of the firewall gateway device described herein, the physical switching component includes a respective at least one dual in-line package (DIP) switch, wherein actuators of the DIP switch are manually positioned to designate the communication protocol.

According to aspect of the firewall gateway device described herein, identifying the one or more packets as suspicious packets includes conducting a digital filtering process on the one or more packets.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

A firewall gateway device and related methods for protecting a distributed energy resource against cyberattack are disclosed. In particular, the disclosed subject matter pertains to an application specific firewall gateway device that is configured to prevent cyberattack, hacking, and unauthorized access to distributed energy resources associated with an electric grid, virtual power plants, and/or electric microgrids. In particular, the subject matter herein includes a firewall gateway device that serves as both a distributed energy resource communications gateway and a hardware-based firewall that facilitates the secure monitoring and control of a distributed energy resource (or a plurality of distributed energy resources) by a cloud-based host computer system and/or an artificial intelligence (AI) computer algorithm. Specifically, the firewall gateway device is configured to protect a remotely monitored distributed energy resource and/or remotely controlled distributed energy resource against hacking, cyberattacks, and unauthorized access by malicious actors. The disclosed firewall gateway device may comprise a combination of electronic elements, electromechanical components, communications protocols, firmware, source code, and packaging. Moreover, the firewall gateway device utilizes a number of fail-safe and fault-tolerant design features/techniques that ensures the firewall gateway device is operating properly. Attempts to tamper or disrupt the operation of the firewall gateway device either by physical means, digital means, or both will result in a remote access lockout via a fail-safe circuit. All such events are detected, logged, and reported.

Notably, firewall gateway device 200 can be configured to secure electric grid operations, with focus on host computer systems supporting energy management system ("EMS") interfaces to distributed energy resources, distributed management system ("DMS") interfaces to distributed energy resources, supervisory control and data acquisition ("SCADA") interfaces to distributed energy resources, and virtual power plant ("VPP") interfaces to distributed energy resources. In some embodiments, the interface protocols to be secured by the disclosed firewall gateway device include DNP 3.0 level 1, 2, and 3 plus encryption, IEC-870-5-101, and/or Modbus RTU. Physical layer media may be communicated by the disclosed firewall gateway device via point-to-point hardwire, dedicated radio, broadband, fiber optics, telecom carrier wireless, microwave, cable, laser, or other media. The interface port to the distributed energy resource shall be either serial RS-232-C port or serial RS-485 port, or TCP/IP port (as described in greater detail below)

Figure 1:
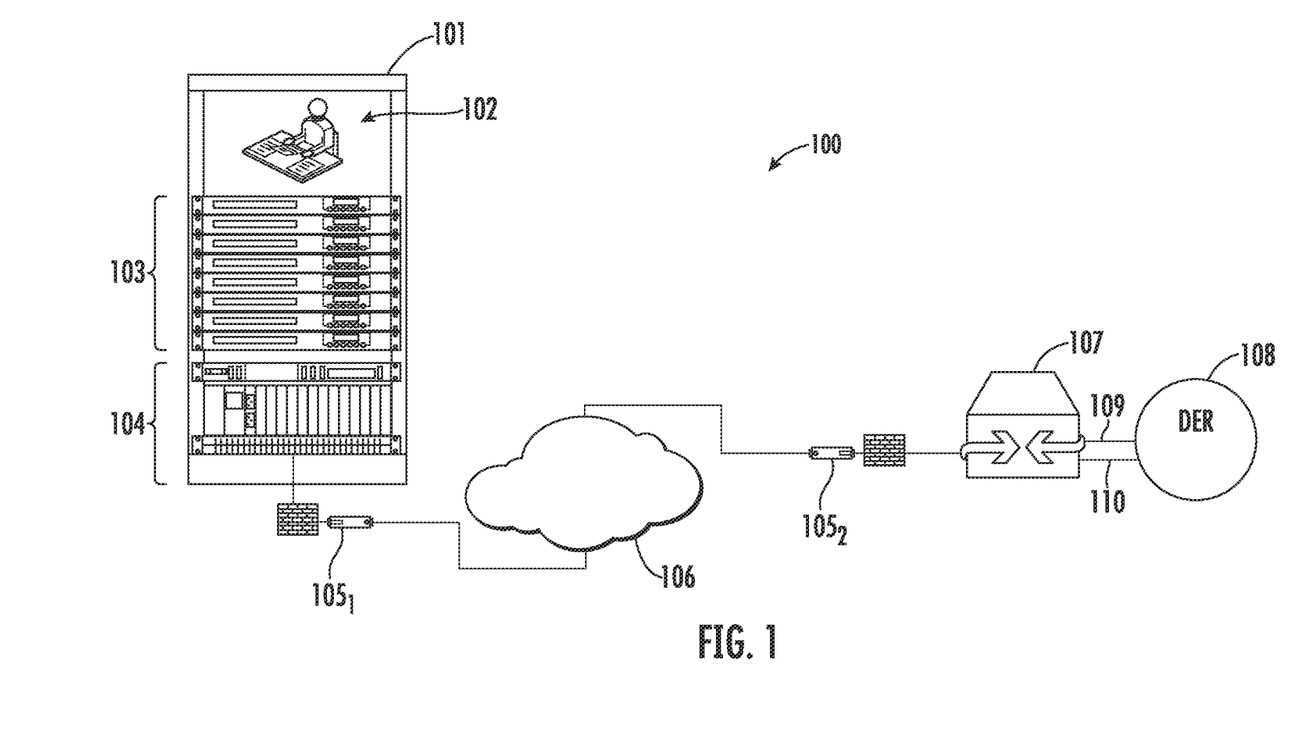
FIG. 1 is a diagram of host computer system communicatively connected to a firewall gateway device according to an embodiment of the subject matter described herein.

FIG. 1 is a schematic of an electric grid management network 100 that includes an exemplary firewall gateway device 107 according to an embodiment of the subject matter described herein. Notably, firewall gateway device 107 can be configured to communicatively connect a distributed energy resource (DER) 108 to an operator's host computing system 101. Host computing system 101 may include any control system that is used to manage and monitor a plurality of distributed energy resources via remote access. As shown in FIG. 1, host computing system 101 may include operator controls and interfaces that can be utilized by an operator or administrator. Host computing system 101 may further include one or more computer servers 103 and a plurality of applications (e.g., software applications, artificial intelligence applications, etc.) and algorithms 104 that are hosted and executed by computer server(s) 103.

In some embodiments, host computing system 101 can be configured to be communicatively connected to firewall gateway device 107 via a number of routers 105 and the Internet 106. For example, firewall gateway device 107 may include an on-board TCP/IP port that is used to establish a connection with a network switch or router (or equivalent switching/routing device), such as TCP/IP network router $105_2$. Each of depicted TCP/IP routers $105_1$ and $105_2$ may also include a general purpose firewall with virtual private network (VPN) capabilities.

In some embodiments, TCP/IP network router $105_1$ enables firewall gateway device 107 to connect to host computer system 101 by supporting the end-user standards and practices for network security. Standards and practices supported by firewall gateway device 107 may include MAC address, authentication, denial-of-service prevention, fixed IP address and subnet mask, VPN support, and other features as required by the end user. In some embodiments, these standards and practices can be customized and written (e.g., burned-in) to a non-volatile memory chip in the firewall gateway device 107, as needed by the end user. In some alternate embodiments, the firewall gateway device 107 can be configured to allow the end user to set an IP address and subnet mask via on-board dipswitch settings (i.e., discussed in detail below). Notably, network settings on firewall gateway device 107 cannot be set remotely and/or via software program instructions in any scenario.

The firewall gateway device 107 may also be adapted to connect to a distributed energy resource (DER) 108 by a specific enabled protocol over a serial port connection. For example, firewall gateway device 107 and distributed energy resource 108 may be configured to communicate directly using a Modbus RTU protocol, IEC870-5-101 protocol, or DNP 3.0 protocol. In some embodiments, distributed energy resource 108 may include modular, energy generation and storage devices that are configured to provide electric capacity or energy (e.g., less than 10 megawatts (MW) of power). Notably, distributed energy resource 108 and/or related DER systems may be either connected to the local electric power grid or isolated from the grid in stand-alone applications (i.e., islanded mode). Distributed energy resources may include, but is not limited to, an electric microgrid, diesel generators, natural gas generators, a solar generators, wind generators, microturbines, combustion turbines, a battery energy storage system, hydroelectric generators, electric vehicle charging stations, electric vehicles, inverters, natural gas fuel cells, hydrogen fuel cells, or any form of remote terminal unit or industrial control system that may be controlled or monitored via remote access.

A TCP/IP connection between firewall gateway device 107 and distributed energy resource 108 is not recommended, but can be supported. Prudent end-user network security management is required if firewall gateway device 107 and distributed energy resource 108 (and/or a plurality of distributed energy resources) are connected via TCP/IP on a local area network (LAN). Notably, many telecommunications carrier systems are currently employing network connections and no longer support (or are migrating from) point-to-point leased communications service and POTS lines. Further, distributed energy resources (e.g., DER 108) support and may be configured to solely utilize Modbus RTU, DNP3.0, or IEC-870-5-101 protocol communications over serial port(s). Therefore, firewall gateway device 107 may also serve as a gateway between telecommunications carrier system network ports and distributed energy resources that do not support TCP/IP connectivity (but instead provide capability for serial port connectivity).

In some embodiments, firewall gateway device 107 and distributed energy resource 108 are coupled via a watchdog timer relay output connection 109. In particular connection 109 is formed between the output of a watchdog timer relay circuit (see below and in FIG. 2) and an alarm input of DER 108. As described below, if firewall gateway device 107 detects tampering of its onboard circuit board and/or its components, firewall gateway device 107 may be configured to prevent further communications to be delivered to distributed energy resource 108 by creating an open circuit on connection 109. In this scenario, the event (e.g., a local problem or tampering) may be logged in DER 108 or a $3^{rd}$ party PLC). Further, connection 110 is a communication cable existing between firewall gateway and DER 108. In some embodiments, connection 110 is a serial connection or an Ethernet connection.

Although only a few example applications are described herein, it is understood that any number of plausible applications can be implemented within the scope of the disclosed subject matter. For example, firewall gateway device 107 may comprise an application specific firewall gateway that is configured to protect distributed energy resources, as defined above. Generally, firewall gateway device 107 as described herein may protect against cyberattack or similar "hacking" threats to any computer control and/or monitoring system that can remotely communicate with a distributed energy resource via DNP3.0, IEC-870-5-101, or MODBUS RTU protocol over a TCP/IP network. Such control and/or monitoring systems that are compatible with firewall gateway device 107 may include industrial control systems, programmable logic controllers, SCADA remote terminal units, water and wastewater control systems, factory automation systems, distributed control systems, transportation control systems, and many other systems that rely on remote monitoring and/or control.

The firewall gateway device 107 is specifically designed to eliminate the possibility of any form of unauthorized remote access to the control and monitoring of distributed energy resources connected to the electric grids or operating islanded from the grid but still remotely controlled and/or monitored. For example, a plurality of distributed energy resources may be connected to a virtual power plant for the purpose of enabling power trading on an open market, such as Texas ERCOT, by a third party. The firewall gateway device described herein will protect each distributed energy resource connected to the virtual power plant from hacking, tampering, or any form of unauthorized access. One method of eliminating the possibility of any form of cyberattack, hacking, or unauthorized digital intrusion to the protected distributed energy resources is to embed the required protocol into a dedicated "system-on-a-chip" custom processor. An example of such a "system on a chip" element is described below in FIG. 2.

Figure 2:
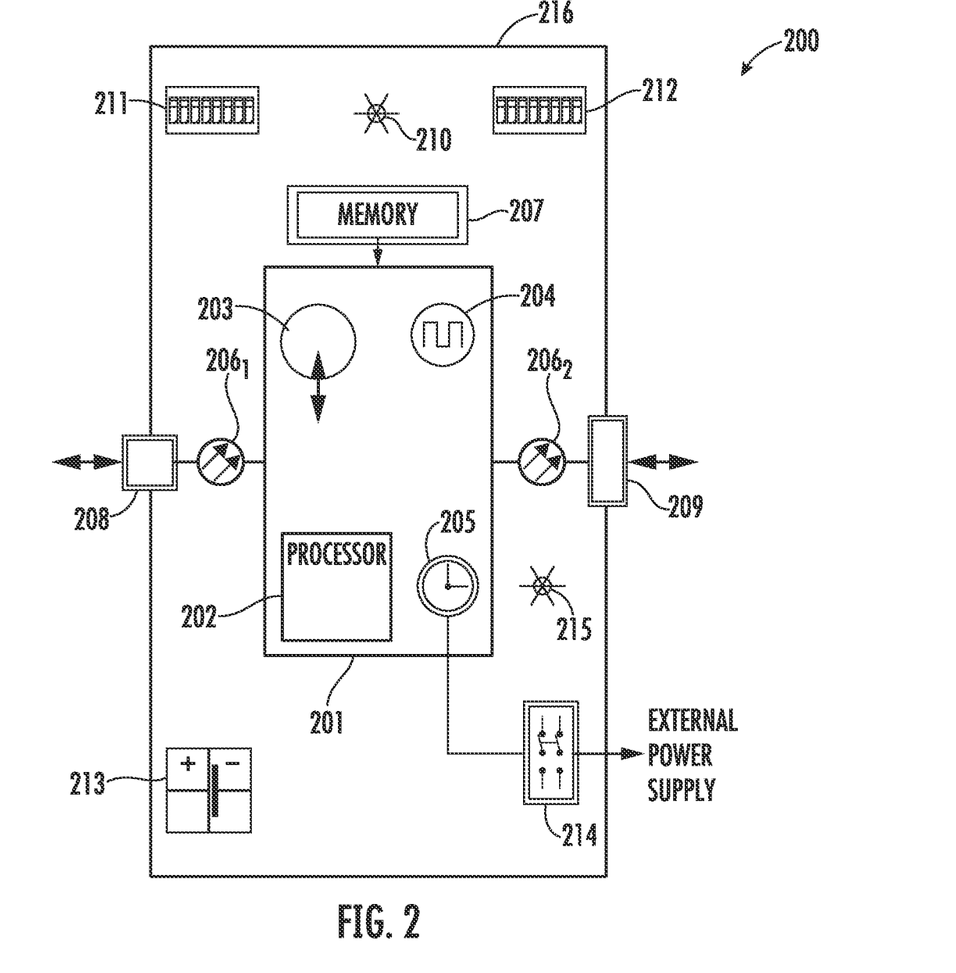
FIG. 2 is a block diagram of a firewall gateway device according to an embodiment of the subject matter described herein.

FIG. 2 is a block diagram of a firewall gateway device according to an embodiment of the subject matter described herein. As depicted in FIG. 2, firewall gateway device 200 may comprise a circuit board element 216 that includes a plurality of components. For example, circuit board element 216 can comprise a "system on a chip" device that includes, but not limited to, a processor 202, random access memory 203, a clock component 204, a failsafe watchdog timer circuit 205, an optical isolator 206, non-volatile memory 207 (e.g., EPROM, EEPROM, or the like), data ports including TCP/IP port(s) 208 and serial port(s) 209 (e.g., RS-232-C, RS-485, or the like), a self-diagnostic indicator light 210, a first dual in-line package (DIP) switch 211, a second DIP switch 212, a power supply 213, a latching relay component 214, and a watchdog time circuit fault indicator 215.

Standard features provided by firewall gateway device 200 include services such as authentication, denial of service prevention, anti-cloning protection, and other best practices to be implemented as required. The specific purpose of firewall gateway device 200 is to secure a connected distributed energy resource from hacking, cyberattacks, tampering, or any form of unauthorized access that may cause faulty operation, damage, or loss of function of the connected distributed energy resource. Moreover, while the description herein largely describes the protection of distributed energy resources, the firewall gateway device may be applied to applications without departing from the scope of the disclosed subject matter. For example, the subject matter herein may be applied to protect similar intelligent systems, such as industrial control systems, remote terminal units, protective relays, substation automation networks, substation gateways, and power plant automation networks.

In some embodiments, firewall gateway device 200 can be configured to communicate via i) DNP3.0 protocol over a TCP/IP port 208 or serial port 209 (e.g., RS-232-C, RS-485, etc.), ii) IEC-870-5-101 protocol over TCP/IP port 208 or serial port 209, or iii) Modbus RTU protocol over TCP/IP port 208 or serial port 209. Specifically, the subject matter described herein eliminates a remote user, a digital worker, or an automated bot's ability to modify firewall gateway device 200 and/or its connected distributed energy resource systems in any manner. Further, a local user cannot programmatically modify firewall gateway device 200. As described below, firewall gateway device 200 utilizes failsafe and fault tolerant configurations that provide protection against attempts of tampering and disruption of the gateway's operation.

Notably, firewall gateway device 200 employs a "system-on-a-chip" central processing unit (e.g., processor 102) running a firmware kernel that supports all features and functions associated with firewall gateway device 200. The kernel, DNP3.0 protocol stack, IEC-870-5-101 protocol stack, Modbus RTU protocol stack, and the user configuration (including the input/output mapping and communications port settings) are stored in non-volatile memory 207 (e.g., EPROM or EEPROM computer memory) mounted in an onboard socket of the firewall gateway device's circuit board. Notably, all programming to support the functionality required to monitor and control each distributed energy resource may be "hardcoded" in firmware stored in non-volatile memory 207. As such, no user programming or software-based configuration of the firewall gateway device will be available remotely or locally. In some embodiments, non-volatile memory 207 may be socketed on circuit board 216 in firewall gateway device 200 to facilitate field modification by physical replacement. Firewall gateway device 200 may contain predefined protocol input/output maps that include DIP switch settable options. Using these input/output maps, firewall gateway device 200 may then pass-through all protocol commands and requests via a RS-232-C/RS-485 serial port to a distributed energy resource, remote terminal unit, metering system, or monitoring system, as directed by the DNP 3.0, IEC-870-5-101, or Modbus RTU host computer system (e.g., host system 101 in FIG. 1).

All user configurations will be limited to enabling or disabling a limited number of features via on-board DIP switch selection using DIP switches 211-212. For example, firewall gateway device 200 can be configured to support three protocols: DNP 3.0, IEC-870-5-101, and Modbus RTU. Adjustment of the actuators on DIP switch 211 (i.e., a dipswitch setting) to particular positions can be used to select and/or enable DNP3.0, IEC-870-5-101, or Modbus RTU protocol. Additional settings (e.g., actuators on DIP switch 212) can be used to select the communications port type for both the host computer interface and the distributed energy resource interface (e.g., serial or TCP/IP). For example, if DNP 3.0 protocol is selected using one or more actuators on DIP switch 211, another actuator on DIP switch 211 can be used to set the option for level 1, 2, or level 3. In yet another embodiment, another switch can be toggled to enable or disable encryption. In all cases, the options selected by the user via the on board DIP switches shall be limited to preprogrammed functions implemented by factory personnel in firmware and written to non-volatile memory 207 (e.g., EPROM or EEPROM). Notable, there is no user programmable memory, including flash memory, disk drive, or other user writeable programmable memory that is employed in the firewall gateway device 200. As such, no person can programmatically modify the executive program, kernel, operating system, software, firmware, or functionality of firewall gateway device 200.

In some instances, use of random access memory 203 may be restricted and/or limited to supporting kernel functions and the buffering of protocol read/write commands and corresponding data in a first in, first out (FIFO) stack.

In some embodiments, failsafe watchdog timer circuit 205 in firewall gateway device 200 is utilized to ensure that processor 202 and computer memory (e.g., memory 207 and RAM 203) are functioning properly. For example, failsafe watchdog timer circuit 205 can be configured to maintain electrical power to an onboard latching relay 214 (e.g., a single pole double throw latching relay for power reset and external monitoring) during normal operation of firewall gateway device 200. Notably, onboard latching relay 214 provides an electrical connection to an external power supply (i.e., external to the firewall gateway device). In some embodiments, the external power supply includes a DC power supply (e.g., a 24 VDC @ 3 amps) that is used to provide electrical power to the firewall gateway's local power supply unit 213. Moreover, the coil output of latching relay 214 can be wired in series with power supply unit 213 (e.g., a direct current (DC) power supply) and is normally set to a closed position.

Notably, latching relay 214 is configured to latch open (e.g., move to an open circuit position) in response to a loss of supplied power from failsafe watchdog timer circuit 205 if the onboard processor 202 stops responding for any reason to the failsafe watchdog timer circuit 205 on a factory set interval (e.g., 10 seconds). For example, processor 202 is configured to send "heartbeat" messages that indicate a current state of normal operation to fail safe watchdog timer circuit 205 at the aforementioned frequency. Additional reasons (i.e., "detected problems") for watchdog timer circuit 205 to trigger the coil of latching relay 214 to latch open include power supply failure in firewall gateway device 200, a kernel lockup, a self-diagnostic alarm, a random access memory overflow, corruption of the firmware, tampering with the firmware, failure of the non-volatile memory 207 (e.g., a memory chip failure), and/or removal of the non-volatile memory 207 (e.g., removal of memory chip) from its circuit board socket. In some embodiments, the coil output of latching relay 214 can be hardwired to an external system, such as a remote terminal unit, a sequence-of-events recorder, a protective relay, and/or another monitoring system or intelligent electronic device capable of monitoring the coil output of failsafe watchdog timer circuit 205. In the event that latch relay 214 opens and thereby resulting in power supply interruption (from an external power supply source) to the firewall gateway device 200, the host computer system (e.g., system 101 in FIG. 1) shall alert operators to dispatch personnel to the physical location of firewall gateway device 200 to diagnose the problem. In particular, dispatched personnel can manually reset failsafe watchdog timer circuit 205, thereby restoring remote communications between firewall gateway device 200 and the host computer system.

Diagnostic procedures that are to be conducted prior to local personnel resetting the latching relay 214 of the failsafe watchdog timer circuit 205 may include, at a minimum, determination if i) firewall gateway device 200 was tampered with, ii) firewall gateway device 200 was replaced with an alternate unauthorized device, or iii) firewall gateway device 200 was damaged. In some embodiments, firewall gateway device 200 will only be custom-made by authorized vendors and under strict license control. Moreover, non-volatile memory 207 (e.g., onboard non-volatile memory chip) can be programmed and supplied by the original manufacturer only. Specifically, the source code for the kernel of firewall gateway device 200 may be written as an original program by in-house employees, kept secret, and protected from distribution, license, or resale. While it is possible that a malicious actor could access/obtain a legitimate firewall gateway device from inventory, replace the factory supplied non-volatile memory chip with a chipset containing a rogue program, and deploy the corrupted firewall gateway device into service during a new installation without detection. As such, the "system-on-a-chip" processor 202 of the firewall gateway device may be equipped and/or provisioned with an immutable algorithm (e.g., stored in memory 207 and executed by processor 202) that is configured to verify the validity of the kernel firmware during bootup. The details of the precise functions and methods of such algorithm shall remain secret to the firewall gateway manufacturer.

Figure 3:
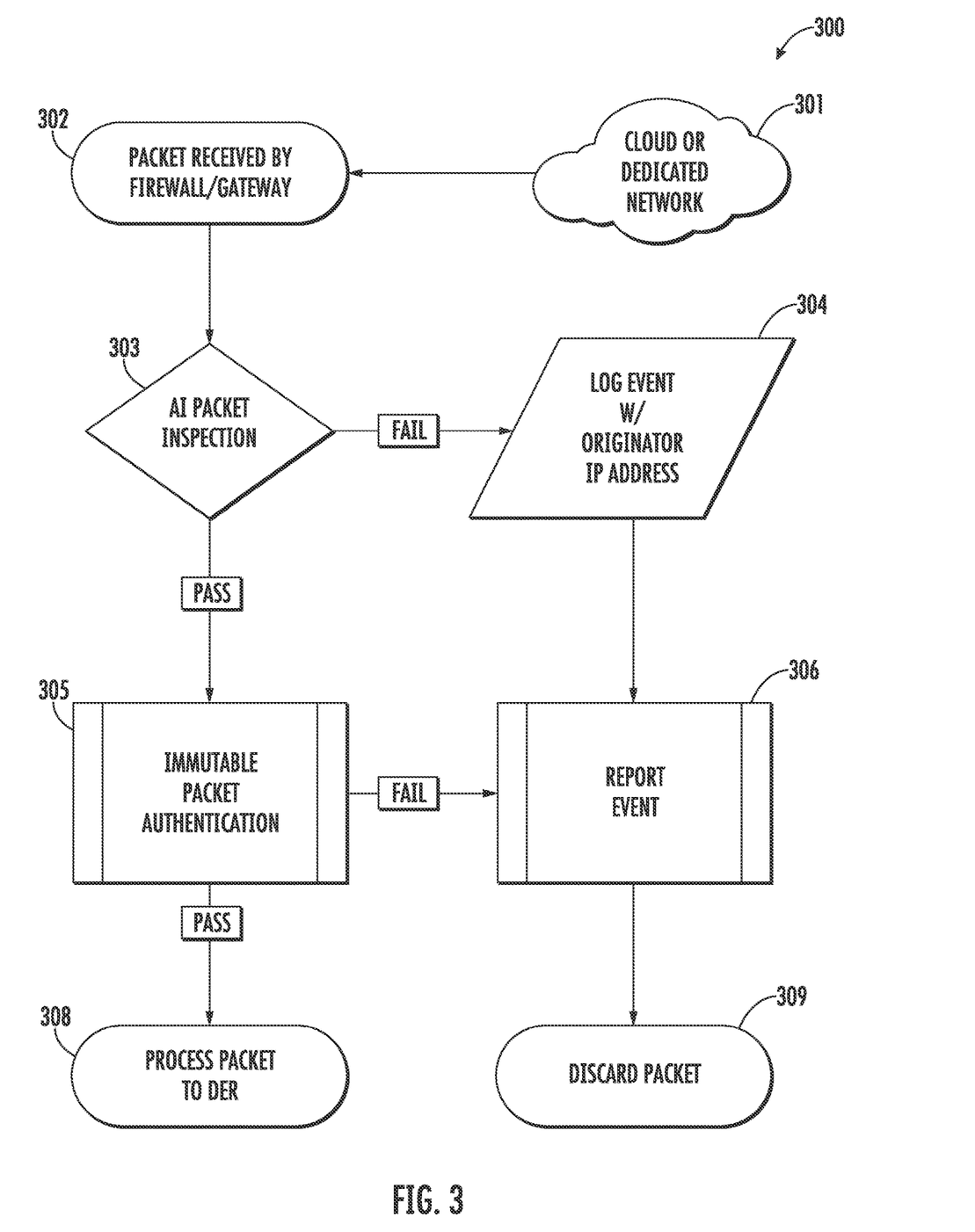
FIG. 3 is a flow diagram of an exemplary digital filtering function executed by the firewall gateway device according to an embodiment of the subject matter described herein.

FIG. 3 is a flow diagram of example digital filtering process executed by the firewall gateway device according to an embodiment of the subject matter described herein. In some embodiments, digital filtering process 300 may be an algorithm or program that is stored in memory and executed by a processor of the firewall gateway device.

In step 301, one or more packets originate in a computing cloud or dedicated network. The packets may include commands or instructions directed to a distributed energy resource from a host computer system. Alternatively, the packets may originate from a malicious actor. In step 302, the one or more packets are received by the firewall gateway device. In step 303, a digital filtering process in the firewall gateway device conducts packet inspection on the received one or more packets. For example, the firewall gateway device firmware may include an AI-enabled function or engine that can be used to inspect each of the communications packets received by the firewall gateway device via any of its communications ports (e.g., serial port, TCP/IP port, etc.). In some embodiments, the digital filtering process may be configured to perform a protocol compliance check by identifying and/or designating packets as suspicious packets if the ingress messaging fails to correspond to the enabled communication protocol. In the event that an erroneous, suspicious, or malicious packet is detected by the digital filtering function, the packet will be rejected by the firewall gateway device (e.g., step 304). In such a scenario, the detected event (and the source and/or originating IP address) will be logged by the digital filtering process. In step 306, the failed event is reported to the network administrator.

Returning to step 303, if the packet successfully passes AI packet inspection, process 300 continues to step 305 where the digital filtering process attempts to authenticate the inspected packet. For example, the packet can be processed by an immutable authentication algorithm (stored in memory and executed by the on-board processor). If a packet successfully passes the authentication process, the packet is subsequently is sent by the digital filtering engine to the serviced distributed energy resource (e.g., see step 308). In contrast, if the packet fails the authentication inquiry, the process continues to step 306 where the failed authentication event is reported to the network administrator (and is optionally logged). Afterwards, the process continues to step 309 where the packet is rejected and/or discarded.

Figure 4:
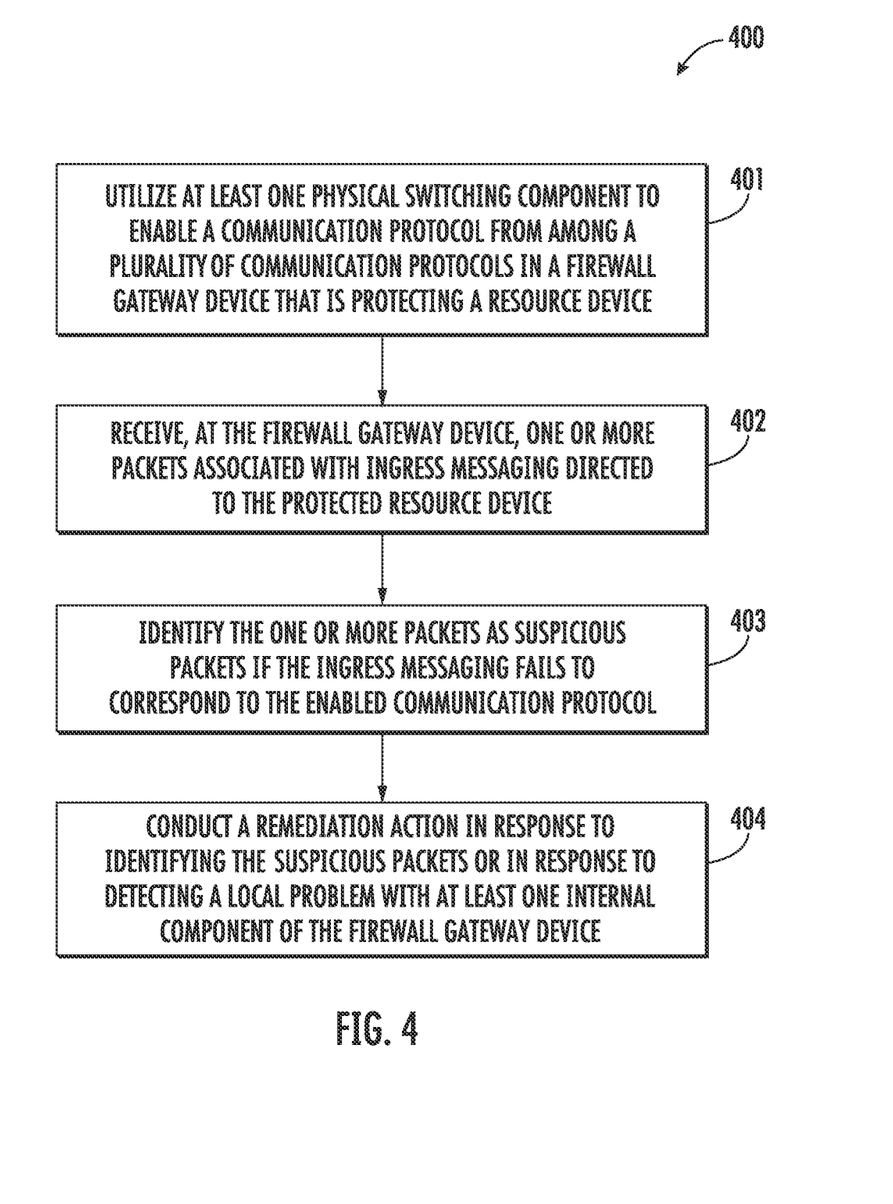
FIG. 4 is a flow chart illustrating an exemplary process for securely monitoring and controlling a distributed energy resource according to an embodiment of the subject matter described herein.

FIG. 4 is a flow chart illustrating an exemplary process for securely monitoring and controlling a distributed energy resource according to an embodiment of the subject matter described herein.

In block 401, at least one physical switching component is utilized to enable a communication protocol from among a plurality of communication protocols in a firewall gateway device that is supporting at least one protected resource device. In some embodiments, one or more DIP switches can be used to designate and/or enable a communication protocol to be used by the firewall gateway device. Notably, such communication protocol (e.g., DNP3.0, IEC-870-5-101, or Modbus RTU protocol) should correspond to the particular communication protocol utilized by the one or more DERs supported by the firewall gateway device.

In block 402, one or more packets associated with ingress messaging directed to the at least one DER is received by the firewall gateway device. For example, the firewall gateway device may receive packets representing commands or instructions via one or more of its serial ports or TCP/IP ports.

In block 403, the one or more packets are identified as suspicious packets if the ingress messaging fails to correspond to the enabled communication protocol. In some embodiments, the firewall gateway device may be configured inspect the ingress packets and determine that the packets are not of the same type as the currently designated communication protocol (e.g., DNP3.0, IEC-870-5-101, or Modbus RTU protocol). If such packets are detected, the firewall gateway device can designate such packets as suspicious packets. In some embodiments, the firewall gateway device can also conduct the digital filtering process detailed in FIG. 3 above at this stage.

In block 404, a remediation action is conducted in response to the identifying of suspicious packets or in response to detecting a local onboard circuit board problem with at least one internal component of the firewall gateway device. In some embodiments, if suspicious packets are identified, the firewall gateway device is configured to block and store the packet(s), log the packets, discard the packets, and/or issue an alert regarding the discovery of the suspicious packet (e.g., to a network operator). In some embodiments, the firewall gateway device is configured to detect a local device-specific problem with at least one internal component of the firewall gateway device. For example, the firewall gateway device can be configured to detect a number of possible local onboard circuit board problems that include, but are not limited to, a power supply failure, a kernel lockup, a self-diagnostic alarm, a random access memory overflow, corruption of the firmware, tampering with the firmware, failure of the non-volatile memory (e.g., a memory chip failure), and/or removal of the non-volatile memory (e.g., removal of memory chip) from its circuit board socket. In response to detecting such local problems, the remediation action involves a failsafe watchdog time relay circuit that is activated and triggers a latching relay to an open position, thereby preventing all power being supplied to the processor and/or system-on-a-chip component in the firewall gateway device. As such, all communications from the firewall gateway to the protected distributed energy resource is blocked and/or prevented.

As indicated above, the disclosed subject matter pertains to an application specific firewall gateway device for protecting distributed energy resources. Generally, the firewall gateway device as described herein is configured to protect against cyberattacks or similar "hacking" threats to any computer control and/or monitoring system that communicates via DNP3.0, IEC-870-5-101, or MODBUS RTU protocols over a TCP/IP network. Examples of such control and/or monitoring systems may include, but are not limited to, industrial control systems, programmable logic controllers, SCADA remote terminal units, water and wastewater control systems, factory automation systems, distributed control systems, transportation control systems, and any other system that relies on remote monitoring and/or control.

It is appreciated that disclosed firewall gateway device, digital filtering engine, and/or functionality described herein improves the technological field of cyberattack prevention and mitigation. For example, the disclosed subject matter affords the following advantageous aspects and/or functionalities:

1. No programmatic user modifications to the firewall gateway device are supported, thereby eliminating opportunities for a malicious remote user to exploit.
2. User configuration of the firewall gateway device options are set by electromechanical means (e.g., dipswitch, jumpers, etc.).
3. The firewall gateway device utilizes a dedicated kernel operating system, not a generic operating system (e.g., Linux, Microsoft, etc.) that is recognizable and familiar to malicious remote users.
4. The firewall gateway device employs no third-party software, drivers, or applications that can be possibly be designed or tampered by a malicious actor.
5. The firewall gateway device further includes a latching relay controlled by a failsafe watchdog timer circuit that is configured to interrupt/terminate a supply of electrical power to the firewall gateway device in certain detected scenarios, thereby preventing further interaction with an associated distributed energy resource until the latching relay is manually reset to a closed position.
6. In one security configuration, the firewall gateway device may be configured to connect to the distributed energy resource via a serial port connection over one or more of the Modbus RTU, DNP3.0, or IEC-870-5-101 protocols. Notably, the firewall gateway device may connect to a host computer (or LAN) via a TCP/IP port connection over Modbus RTU, DNP3.0, or IEC-870-5-101. As such, this security configuration provides no means for a remote user to access the distributed energy resource system's user configuration, memory functions, or other means by which a remote user could access the distributed energy resource. Notably, the security configuration provides a physical layer protection barrier between a remote user and the distributed energy resource.
7. The firewall gateway device employs firmware techniques and features that are proprietary in nature.
8. End users may specify a proprietary version of firmware for the firewall gateway device, which shall be designed and provisioned in the factory only.
9. The firewall gateway device can be designed to operate with minimal CPU and memory resources with little or no extra resources available. In some embodiments, this design technique may require that the firmware be implemented as efficiently as possible (e.g., machine code), further impeding a third-party from modifying the firewall gateway device firmware (i.e., preventing the addition of new programming code).
10. The CPU may utilize a digital filtering algorithm to verify the firmware authenticity during bootup as well as verify the firmware on a periodic basis during normal operation. The firewall gateway device may also fail safe and latch open the onboard relay in case the firmware authenticity check fails for any reason whatsoever.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for protecting a resource device, the method comprising:
   utilizing, by a firewall gateway device protecting the resource device, a first physical switching component to enable a communication protocol from among a plurality of communication protocols in the firewall gateway device, wherein the communication protocol is a Modbus RTU protocol, a DNP3.0 protocol, or a IEC-870-5-101 protocol, and wherein the first physical switching component includes one or more electromechanical dual in-line package (DIP) switches that are located on a circuit board element of the firewall gateway device, and via positioning of actuators on the one or more DIP switches and predefined protocol input/output maps stored in non-volatile memory mounted on the circuit board element, provide the only user configuration means to enable only one communication protocol from among the plurality of communication protocols;
   utilizing, by the firewall gateway device, a second physical switching component that includes additional electromechanical dual in-line package (DIP) switches that are located on the circuit board element of the firewall gateway device and, via positioning of actuators on the additional DIP switches, provide means to enable selection of a type of a data port of the firewall gateway device;
   receiving, at the firewall gateway device via the data port, one or more packets associated with ingress messaging directed to the protected resource device;
   identifying, by the firewall gateway device, the one or more packets as suspicious packets if the ingress messaging fails to correspond to the enabled communication protocol; and
   conducting, by the firewall gateway device, a remediation action in response to identifying the suspicious packets or in response to detecting a local problem with at least one internal component of the firewall gateway device, wherein the local problem includes at least one of: a power supply failure, a kernel lockup, a self-diagnostic alarm, a random access memory overflow, corruption of firmware, tampering with the firmware, failure of the non-volatile memory, or removal of the non-volatile memory from a circuit board socket, and wherein the remediation action includes a failsafe watchdog timer circuit instructing a latching relay to switch to an open position to prevent power from being supplied to the firewall gateway device, in response to detecting the local problem.

2. The method of claim 1 wherein the protected resource device includes a distributed energy resource device.

3. The method of claim 1 wherein the ingress messaging includes control messages related to the security and monitoring of the protected resource device.

4. The method of claim 1 wherein actuators of the one or more electromechanical DIP switches are manually positioned to designate the communication protocol.

5. The method of claim 1 wherein identifying the one or more packets as suspicious packets includes conducting a digital filtering process on the one or more packets.

6. A firewall gateway device comprising:
a first physical switching component configured to enable a communication protocol from among a plurality of communication protocols in a firewall gateway device that is protecting a resource device, wherein the communication protocol is a Modbus RTU protocol, a DNP3.0 protocol, or a IEC-870-5-101 protocol, and wherein the first physical switching component includes one or more electromechanical dual in-line package (DIP) switches that are located on a circuit board element of the firewall gateway device, and via positioning of actuators on the one or more DIP switches and predefined protocol input/output maps stored in non-volatile memory mounted on the circuit board element, provide the only user configuration means to enable only one communication protocol from among the plurality of communication protocols;
at least one data port that is configured to receive one or more packets associated with ingress messaging directed to the protected resource device;
a second physical switching component that includes additional electromechanical dual in-line package (DIP) switches that are located on the circuit board element of the firewall gateway device and, via positioning of actuators on the additional DIP switches, provide means to enable selection of a type of the data port;
a digital filtering engine configured to identify the one or more packets as suspicious packets if the ingress messaging fails to correspond to the enabled communication protocol and to conduct a remediation action in response to identifying the suspicious packets or in response to detecting a local problem with at least one internal component of the firewall gateway device, wherein the local problem includes at least one of: a power supply failure, a kernel lockup, a self-diagnostic alarm, a random access memory overflow, corruption of firmware, tampering with the firmware, failure of the non-volatile memory, or removal of the non-volatile memory from a circuit board socket; and
a failsafe watchdog timer circuit configured to conduct the remediation action, wherein the remediation action includes the failsafe watchdog timer circuit instructing a latching relay to switch to an open position to prevent power from being supplied to the firewall gateway, in response to detecting the local problem.

7. The firewall gateway device of claim 6 wherein the protected resource device includes at least one distributed energy resource device.

8. The firewall gateway device of claim 6 wherein the ingress messaging includes control messages related to the security and monitoring of the protected resource device.

9. The firewall gateway device of claim 6 wherein actuators of the one or more electromechanical DIP switches are manually positioned to designate the communication protocol.

10. The firewall gateway device of claim 6 wherein identifying the one or more packets as suspicious packets includes conducting a digital filtering process on the one or more packets.

* * * * *